Dec. 14, 1965   R. W. HUTCHINSON ETAL   3,223,908
ELECTRIC VEHICLE CONTROL
Filed Sept. 9, 1960   2 Sheets-Sheet 1

INVENTORS
Richard W. Hutchinson
BY John S. Wroby

C. P. Meland
Their Attorney

Dec. 14, 1965   R. W. HUTCHINSON ETAL   3,223,908
ELECTRIC VEHICLE CONTROL
Filed Sept. 9, 1960   2 Sheets-Sheet 2

INVENTORS
Richard W. Hutchinson
John S. Wroby
BY C. R. Meland
Their Attorney

United States Patent Office 3,223,908
Patented Dec. 14, 1965

3,223,908
ELECTRIC VEHICLE CONTROL
Richard W. Hutchinson and John S. Wroby, Birmingham, Mich., assignors to General Motors Corporation, Detroit, Mich., a corporation of Delaware
Filed Sept. 9, 1960, Ser. No. 54,962
8 Claims. (Cl. 318—139)

This invention relates to motor control systems for electrically driven vehicles and more particularly to a motor control system that has improved accelerating characteristics.

One of the objects of this invention is to provide a motor control system for an electric motor driven vehicle wherein the vehicle drive motor is accelerated in steps, thus reducing the sharp surges of current drawn by the motor as compared to heretofore known motor control systems.

Another object of this invention is to provide a motor control system for an electric motor driven vehicle that has at least two running speeds and wherein the motor is accelerated to these running speeds by a step-wise acceleration system under the control of time relay means.

A further object of this invention is to provide a motor control system for an electric motor driven vehicle wherein the acceleration of the motor is controlled by a plurality of time delay relays so as to cause a step-wise acceleration of the motor.

Still another object of this invention is to provide a power supply system for an electric motor driven vehicle, wherein a plurality of batteries are used to supply current to the motor and wherein all of the batteries are used regardless of the output speed of the motor to thereby even out the power delivered by each battery.

Further objects and advantages of the present invention will be apparent from the following description, reference being had to the accompanying drawings wherein preferred embodiments of the present invention are clearly shown.

Figure 1:
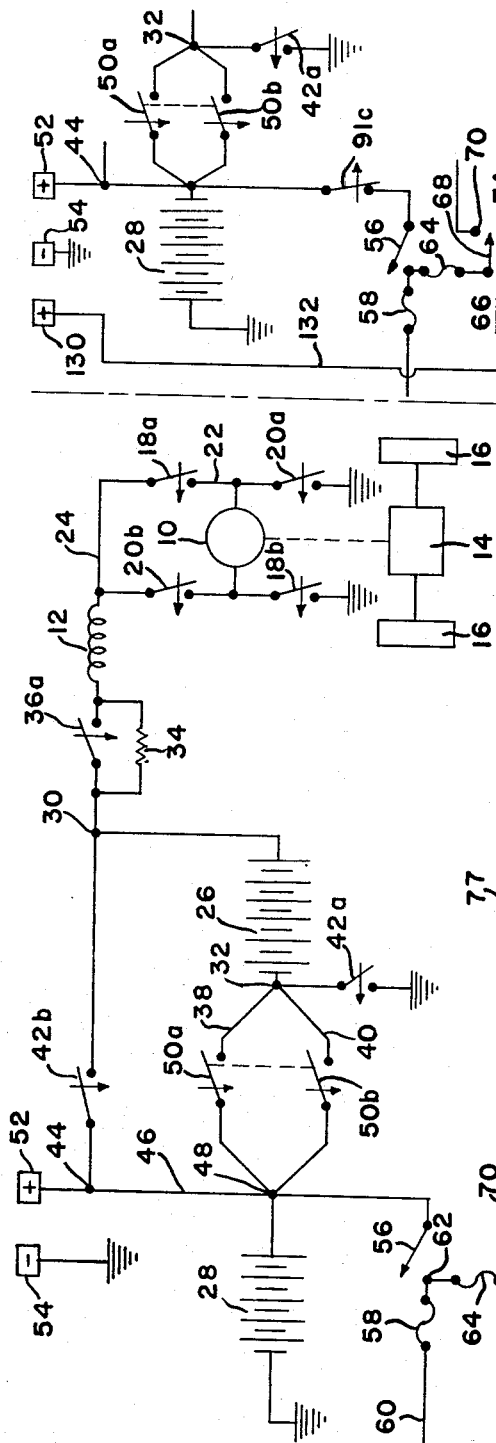
FIGURE 1 is a schematic circuit diagram of a motor control system made in accordance with this invention.

Referring now to the drawings and more particularly to FIGURE 1, the reference numeral 10 designates an armature of a series type motor which has a field winding 12. The armature 10 is mechanically connected with a power transmitting means 14 which serves to drive the wheels 16 of the electrically driven vehicle. The method of transmitting the power between the armature 10 and the wheels 16 forms no part of the present invention and could take any one of various well-known forms.

One side of the armature 10 is connected with relay operated contactors 18a and 20a by the conductor 22. The relay contactor 18a is controlled by a relay coil 18 whereas the contactor 20a is controlled by the relay coil 20. The arrows through the contactors 18a and 20a indicate that these contactors are normally open but are pulled to the closed position when the coil windings 18 and 20 are energized. It is seen that when the relay contactor 20a is in a closed position a circuit is made directly to ground from one side of armature 10 whereas when the relay contactor 18a is in a closed position, one side of the armature is connected with the lead wire 24 that is, in turn, connected to one side of the field winding 12.

In a similar fashion, the contactors 18b and 20b are connected to an opposite side of the armature 10, the contactor 18b being controlled by coil winding 18 and the contactor 20b being controlled by coil winding 20. It, thus, is seen that when coil winding 20 is energized, the contactors 20a and 20b are pulled to a closed position to provide one current path through the armature 10 whereas when the coil winding 18 is energized the contactors 18a and 18b are pulled to a closed position to provide another current path through the armature winding 10 that is in a reverse direction from the first current path. It is apparent, therefore, that these contactors control the direction of current flow through the armature 10 and, thus, the direction of rotation of the armature shaft.

In the control system of this invention the storage batteries 26 and 28 form the source of power for energizing the the electric drive motor. It is seen that one side of storage battery 26 is connected with junction 30 whereas the opposite side of this storage battery is connected with junction 32. A resistor 34 having a small resistance value, for example, .015 ohm where the batteries are each 12 volts, is connected between the junction 30 and one side of the field winding 12. This resistor 34 is shunted by a relay operated contactor 36a which is controlled by the relay coil 36. The relay contactor 36a is normally open but is pulled to a closed position whenever the relay coil 36 is energized as is indicated by the arrow through the contactor.

The junction 32 is connected with lead wires 38 and 40 and it is also connected to one side of a relay operated contactor 42a. The relay contactor 42a is controlled by the coil winding 42 and this coil winding also controls the movement of contactor 42b which is connected between junction 44 and junction 30. Both contactors 42a and 42b are normally open and are shifted to a closed position whenever the relay coil 42 is energized.

The junction 44 is connected with the lead wire 46 which is, in turn, connected with junction 48. It is seen that junction 48 is connected to one side of the battery bank 28, the opposite side of this battery bank being connected directly to ground. The junction 48 is connected to one side of relay operated contactors 50a and 50b which operate together and which are controlled by the relay coil 50. Both contactors 50a and 50b are normally open but when the relay coil 50 is energized they are closed to complete circuits between the junction 32 and the junction 48.

The junction 44 is connected with a junction 52 that is adapted to be connected to a source of charging current for charging batteries 26 and 28. Another junction 54 is provided which is connected directly to the ground of the vehicle system which forms the other input terminal for charging current for charging the battery banks 26 and 28. It will be appreciated that these junctions 52 and 54 might take the form of a receptacle.

The junction 48 is connected to one side of a key operated switch having the manually operable shiftable contactor 56. The fixed contact of this switch 62 is connected to one side of a fuse 58, the opposite side of this fuse being connected with lead wire 60 that is adapted to feed the horn and lights of the electrically driven vehicle. The fixed contact 62 is also connected with fuse 64 and the opposite side of this fuse is connected with a switch which is generally designated by reference numeral 66. The switch 66 is a manually operable selector switch and includes a manually shiftable contactor 68 that may be shifted selectively into engagement with the fixed contacts 70, 74 and 76. As will become more readily apparent hereinafter, the shifting of this contactor into engagement with fixed contact 70 provides forward movement for the vehicle, engagement with contact 74 provides reverse movement for the vehicle whereas when the contactor 68 is in engagement with fixed contact 76 the system is in a condition to have the batteries 26 and 28 charged from the receptacle or junctions 52 and 54. The switch 66 in FIGURE 1 is shown in its "Off" position.

The fixed contactor 70 is connected with a lead wire 77 which is, in turn, connected with manually operable contactors 78 and 79 which are ganged to move together. In one position of these contactors 78 and 79, the contactor 78 engages the fixed contact 80. In another position of these contactors 78 and 79, the contactor 79 engages fixed contact 81 whereas the contactor 78 engages the fixed contactor 82. In still another position the contactor 79 engages fixed contact 83 whereas the contactor 78 engages fixed contact 84. In the first of these positions a low speed is provided for the vehicle whereas in the second position a high speed is provided. When the contactors 78 and 79 are shifted into engagement respectively with fixed contacts 83 and 84, an emergency or high speed condition is set up as will become readily apparent hereinafter.

The lead wire 77 is connected to one side of a relay operated contactor 85a, the opposite side of this contactor being connected with junction 86, and thus to one side of coil winding 20 and to one side of a series connected resistor and condenser. The relay contactor 85a is normally in a closed position but is shifted to an open position when the coil winding 85 is energized. The coil winding 85 also controls the operation of the contactor 85b which is in a normally open position but which is closed whenever the relay coil 85 is energized. It can be seen that the contactor 85b is connected between junctions 86 and 87, the junction 86 being connected with lead wire 88 which feeds the coil windings 18 and 85 and a series connected resistor and condenser. The junction 86, as can be seen from FIGURE 1, is also connected with the fixed contact 74 of the manually operable switch 66.

The fixed contact 76 of the manually operable control switch 66 is connected with a junction 89 and it is seen that this junction is connected with the lead wire 90. The lead wire 90 is connected to one side of the coil winding 91 and is also connected to one side of a relay operated contactor 91a which is normally open and which is closed when the relay coil 91 is energized. The relay coil 91 also controls the contactor 91b which is a normally closed contact but which is opened whenever the relay coil 91 is energized. One side of the contactors 91a and 91b are connected with a junction 92 and it is seen that this junction is connected to one side of the relay coil 42 and to one side of a series connected resistor and condenser. The opposite side of the contactor 91b is connected with a junction 93 and it is seen that this junction is connected with the lead wire 94. The lead wire 94 is connected with a junction 96 and is also connected with the lead wire 97. The lead wire 97 is connected to one side of a shiftable contactor 98a which is normally closed but which is opened whenever the coil winding 98 is energized. The coil winding 98 also controls the operation of contactor 98b which is a normally open contactor and which is shifted to a closed position whenever the coil winding 98 is energized.

The shiftable contactors 85c and 85d which are connected in series with one another and with the junction 96 are controlled by the relay coil 85. As can be seen, the contactor 85c is a normally open contact whereas the contactor 85d is a normally closed contact. One side of the contactor 85d is connected with the junction 100 and this junction is at times connected with the junction 102 by the contactor 98b. The junction 102 is connected with fixed contact 84 and is also connected with a junction 104. The junction 104 is connected to one side of relay coil 50 and to one side of a relay coil 106. The relay coil 106 controls the operation of the shiftable contactor 106a which is a normally open contact and which is closed at a predetermined time delay following the energization of the relay coil 106. As an example, the contactor 106 may be pulled to a closed position two seconds following the energization of the coil 106. It is seen that junction 104 is also connected to one side of a series connected resistor and condenser combination.

One side of the switch controlled by contactor 106a is connected with a junction 108 and this junction is connected with fixed contact 83 via a lead wire 110. The junction 108 is connected to one side of a relay operated contactor 112a which is controlled by the relay coil 112. The contactor 112a is a normally closed contact and is shifted simultaneously with the shifting of contactor 112b, when relay coil 112 is energized. It is seen that the switch controlled by relay contactor 112b is connected with the junction 114 which is, in turn, connected to the fixed contact of a switch controlled by the relay contactor 116a. The relay contactor 116a is controlled by relay coil 116 which is also a time delay relay, the contactor 116a being shifted to a closed position two seconds following the energization of the relay coil 116.

The fixed contact 81 which cooperates with the shiftable contactor 79 is connected with switches including the shiftable relay contactor 118a which is shifted in accordance with the energization of relay coil 118. This contactor 118a forms a part of another time delay relay and this contactor will be shifted to a closed position two seconds after the energization of the relay coil 118. The contactor 118a is shunted by a switch including the shiftable contactor 98c which is controlled by the relay coil winding 98.

Assuming now that the operator of the electrically controlled vehicle desires to move in a forward direction in a low speed operation, the key switch 56 is shifted to a closed position, the contactor 68 of control switch 66 is shifted into engagement with the fixed contact 70 and the ganged manually operable contactors 78 and 79 are shifted so that the contactor 78 engages the fixed contact 80. When this switching has occurred, the relay coil 20 will be energized via fixed contact 70, contactor 85a, junction 86 and through the relay coil 20 to ground. The energization of relay coil 20 causes the contactors 20a and 20b to shift to a closed position to complete one current path through the armature 10. The closure of contactor 78 against fixed contact 80 completes a circuit for the relay coil 42 which may be traced via fixed contact 70, lead wire 77, contactor 78, lead wire 94, through contactor 91b to junction 92 and then through the coil winding 42 to ground. The energization of relay coil 42 causes contactors 42a and 42b to be shifted to a closed position thus connecting the 12 volt batteries 26 and 28 in parallel to feed the motor armature 10 and motor field 12. Since the relay coil 36 is not energized at this time, the contactor 36a remains in an open position and the resistor 34 is thus in the circuit between the batteries and the drive motor. The motor thus will be energized with between 7 to 9 volts due to the voltage drop across resistor 34 and will begin to accelerate.

When relay coil 42 was energized, the time delay relay coil 116 was also energized through the normally closed switch contactor 85e. Accordingly, after the predetermined time delay has elapsed, the contactor 116a is moved to a closed position to cause an energization of the relay coil 112. When relay coil 112 is energized, the contactor 112b is shifted to a closed position providing an energization path for the relay coil 36. When relay coil 36 is energized, the contactor 26a is shifted to a closed position to short out the resistor 34 and thus supply the full 12 volts from the parallel connected batteries 26 and 28 to the drive motor. The vehicle will now operate indefinitely on 12 volts as long as the previously mentioned manually operable switches are maintained in their previously set positions.

When the operator of the electrically driven vehicle desires to move forward at a higher rate of speed, the shiftable contactors 78 and 79 are shifted respectively into engagement with fixed contacts 82 and 81. This shifting of these contactors brings about a series of switching events which are the same as that described above when the contactor 78 is shifted into engagement with fixed contact 80. In other words, the initial phase of the acceleration when the contactors 78 and 79 are shifted for high speed is the same as when they are shifted for low speed, or, in other words, the motor is first accelerated with seven to nine volts, and then the resistor is shorted out to provide a full 12 volts to the motor and field. It will be seen that when the contactor 112b was previously closed to cause an energization of relay coil 36 it also completed a circuit for the time delay relay including the coil winding 118. The energization of relay coil 118 causes the closure of the contactor 118a. In the low speed position of switches 78 and 79, this closing of contactor 118a had no effect on the circuit since in this position of contactors 78 and 79 the contactor 79 was out of engagement with fixed contact 81. In the high speed position of contactors 78 and 79, however, a circuit will now be completed for relay coil 98 via the now closed contact 118a which becomes closed two seconds following the energization of relay coil 118. With relay coil 98 energized the contactor 98a is moved to an open position, the contactor 98b is moved to a closed position and the contactor 98c is moved to a closed position. The contactor 98c will thus form a holding circuit for the relay coil winding 98.

With relay contactor 98b in a closed position a circuit is completed through contactor 85d, contactor 98b, and then through junction 104 and thence through relay coil 106 to ground and through the relay coil 50 to ground. With relay coil 50 energized the contactors 50a and 50b are shifted to closed positions to connect the batteries 26 and 28 in series with the drive motor. The drive motor will now be energized with a voltage between 17 to 20 volts since the resistor 34 is in the circuit between the batteries and the drive motor. The resistor 34 is in the circuit at this time since the coil winding 36 is not energized due to the opening of the relay contactor 98a when relay coil 98 was energized.

Since the time delay relay coil 106 was energized when relay contactor 98b became closed, the contactor 106a will close. This will now provide a circuit for the relay coil 36 from junction 104, through the closed contactor 106a, through junction 108, through closed contactor 112a and thence through the relay coil 36 to ground. The energization of relay coil 36 will then cause the contactor 36a to once more close to apply the full 24 volts to the motor and the motor will now run indefinitely on 24 volts.

It can be seen that in this high speed position a four step acceleration took place, namely the motor was first energized with seven to nine volts with resistor 34 in the circuit, was then energized with 12 volts with resistor 34 out of the circuit, was then energized with 17 to 20 volts with batteries 26 and 28 connected in series and with the resistor 34 in the circuit, and was then energized with a full 24 volts with the resistor 34 shorted out of the circuit. This mode of acceleration greatly reduces current surges in the system and thus makes it possible to make many more starts and stops before the batteries are drained of power.

If the operator of the electrically driven vehicle desires sudden forward acceleration, the contactors 78 and 79 are shifted to the emergency position wherein the contactor 78 engages fixed contact 84 and the contactor 79 engages the fixed contact 83. It can be seen that when contactor 78 engages the fixed contact 84 a circuit is immediately completed for the relay coil 50 via junctions 102 and 104. This will cause the batteries 26 and 28 to be connected in series due to a closure of relay contactors 50a and 50b. The simultaneous engagement of contactor 79 with fixed contact 83 causes an energization of relay coil 36 through contactor 112a and thus causes the resistor 34 to be shorted out of the circuit. This provides the full 24 volts to the motor whenever the contactors 78 and 79 are shifted to the so-called emergency position.

When it is desired to move in reverse or backwards in the electrically motor driven vehicle, the shiftable contractor 68 is shifted into engagement with the fixed contact 74. It can be seen that this will complete a circuit for the relay coil 18 via the junction 86. With relay coil 18 energized the contactors 18a and 18b are shifted to a closed position to provide a current path through the motor that is reversed from the current path provided by contactors 20a and 20b. The relay coil 85 will also now be energized via the junction 86. With relay coil 85 energized the contactor 85a is shifted to an open position, contactor 85b is shifted to a closed position, contactor 85c is shifted to a closed position, contactor 85d is shifted to an open position and contactor 85e is shifted to an open position. Of course, the opening of contactor 85a prevents energization of relay coil 20 whereas the closure of container 85b provides a circuit to the lead wire 77 from the fixed contactor 74. It can be seen that if the contactor 78 is in engagement with fixed contact 80 the relay coil 42 is energized via lead wire 94 and contactor 91b. This will cause the contactors 42a and 42b to close to connect the batteries in parallel and since the relay coil 36 is not energized the resistor 34 will be in the circuit and the motor will be accelerated to provide a backward acceleration of the vehicle at seven to nine volts.

If the contactors 78 and 79 are set for high speed position, that is, in contact with fixed contacts 82 and 81, the motor still will only be accelerated with seven to nine volts. This is true since contactor 85d is in an open position and therefore, contactor 78 can only energize the lead wire 94 through the closed contactor 85c. In addition with contactor 85e in an open position the relay coils to the left of junction 93 cannot be energized to provide more than seven or nine volts to the motor. On the other hand, if the contactors 78 and 79 are shifted to the emergency position wherein they engage fixed contacts 84 and 83 the full 24 volts may be applied to the motor for providing an accelerated backward movement.

In order to charge the batteris 26 and 28 from the receptacle junctions 52 and 54, the key switch 56 is closed and the contactor 68 is shifted into engagement with the fixed contact 76 which is the charge position of manually operable switch 66. When contactor 68 engages fixed contact 76 a circuit is completed for the relay coil 91 which causes contactor 91a to shift to a closed position and contactor 91b to an open positon. The closure of contactor 91a permits the energization of relay coil 42 causing contactors 42a and 42b to move to a closed position. The batteries 26 and 28 will now be charged in parallel, the battery 28 being charged from junction 44 and the battery 26 being charged through the closed contactors 42b and 42a. The opening of contactor 91b prevents the motor from being energized should the contactors 78 and 79 be shifted while the batteries are being charged.

It should be pointed out that the relay coil 112 and the contacts which it controls serve to prevent simultaneous movement of the contactors 50a and 50b and 42a and 42b in the case of slow responding or defective time delay relays. In other words, the relay coil 112 and the contacts which it controls prevent the contacts 50a and 50b from closing at the same time as contacts 42a and 42b.

Figure 2:
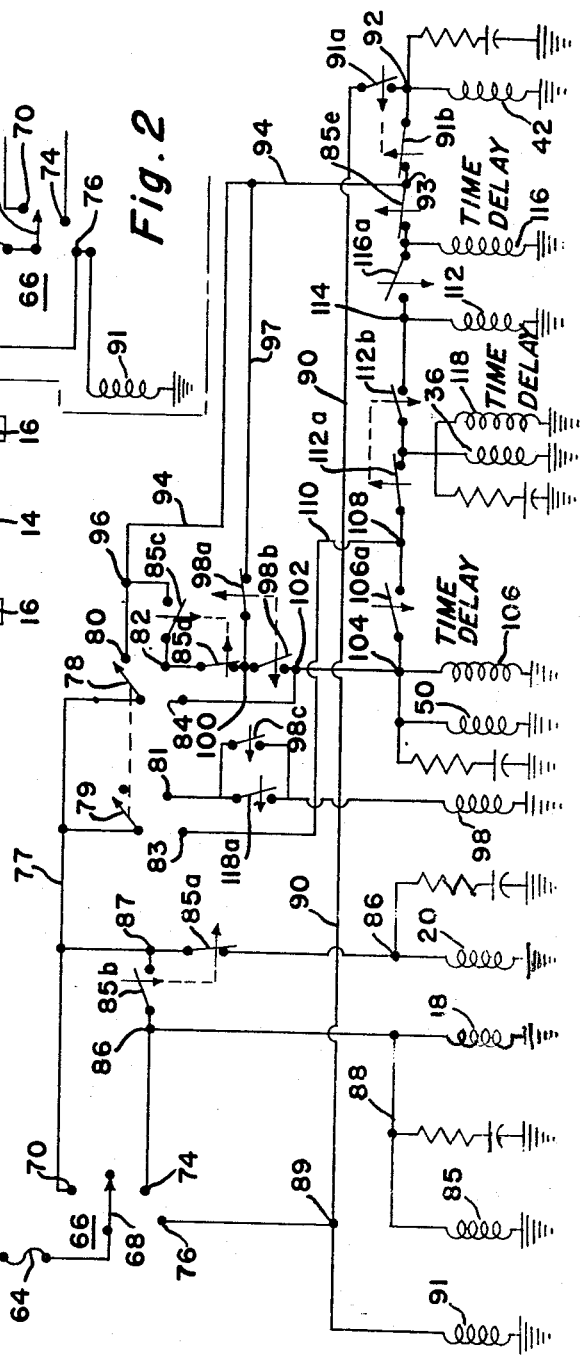
FIGURE 2 is a schematic circuit diagram of a portion of the circuit illustrated in FIGURE 1 and showing a modified arrangement.

Referring now to FIGURE 2, a modified circuit is illustrated which may be used in connection with the circuit of FIGURE 1. In FIGURE 2 only a portion of the circuit illustrated in FIGURE 1 is shown, it being understood that this portion of the circuit can be substituted for a portion of the circuit of FIGURE 1. In FIGURE 2 the same reference numerals have been used to identify the same circuit elements which are common to each figure. The only difference between the arrangement of FIGURE 2 and the arrangement of FIGURE 1 is the addition of another receptacle junction 130 which is a positive junction and will be at the same potential as junction 52 when the receptacle junctions 52, 54 and 130 are connected with a suitable power supply. In addition, another relay operated contactor 91c is provided which is shifted to an open position whenever the relay coil 91 is energized. The additional receptacle junction 130 is connected with a lead wire 132 and it is seen that this lead wire is connected to one side of the coil winding 91.

It can be seen that the lead wire 132 bypasses or shunts both the key operated switch 56 and the manual selector switch 66. It will also be apparent that whenever the receptable junctions 52, 54 and 130 are connected with a suitable power supply the coil winding 91 will be energized immediately from the junction 130. With coil winding 91 energized, the contactor 91c will be shifted to an open position to prevent energizing of any of the control circuits that control the motor since the power supply to one side of the key switch 56 is completely disconnected. The energization of coil winding 91 will, of course, cause contactor 91a to close and contactor 91b to open to, thus, energize relay coil 42 and, therefore, once more shift the batteries to a parallel connection with the junction 52 for charging the batteries in parallel.

Figure 3:
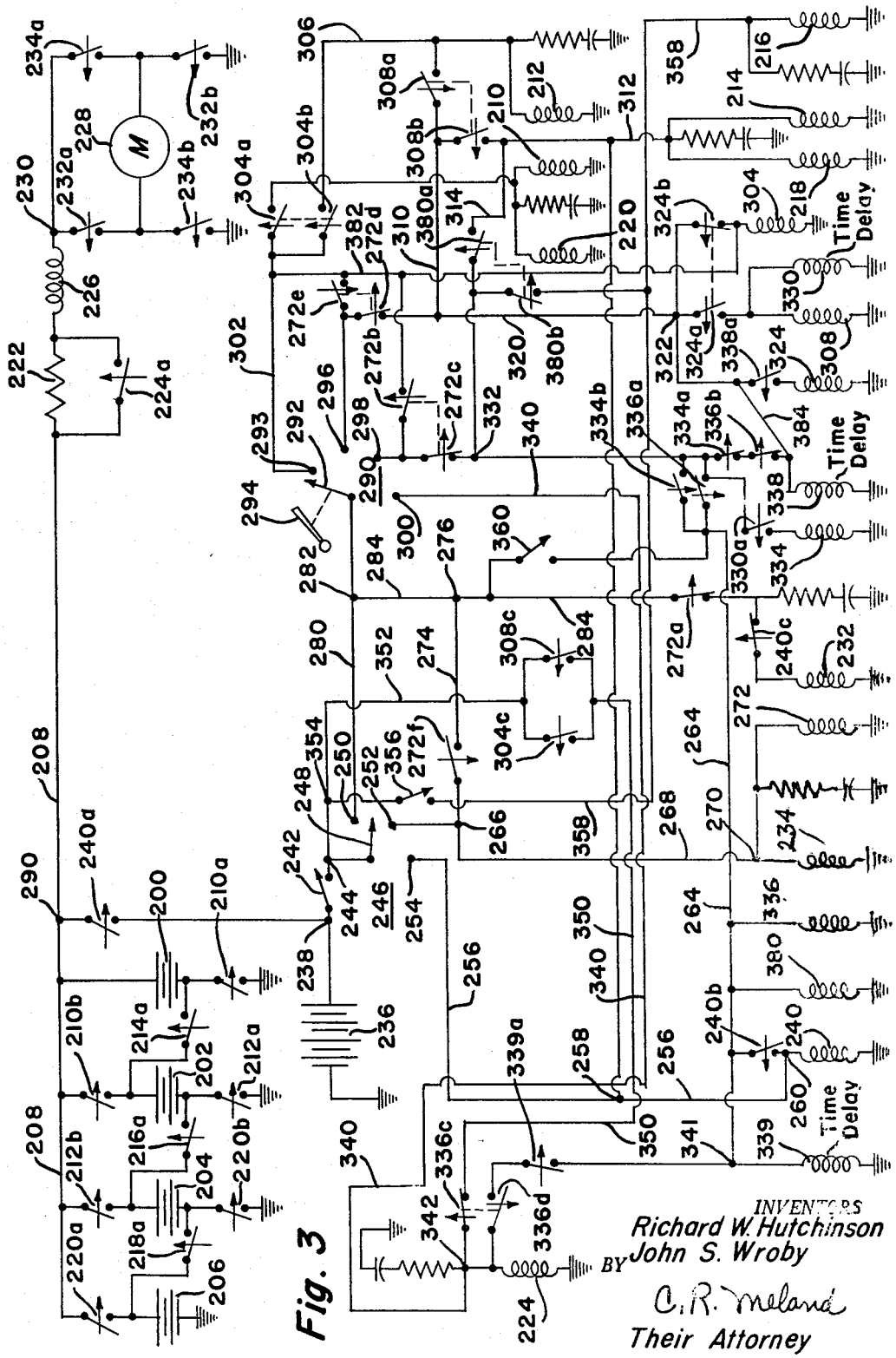
FIGURE 3 is a schematic circuit diagram of a modified motor control system made in accordance with this invention.

Referring now more particularly to FIGURE 3, a modified control circuit for an electrically driven vehicle is illustrated. In this figure, the reference numerals 200, 202, 204, and 206 designate six-volt batteries which are used to power the electric motor of the vehicle. One side of the battery 200 is connected with the lead wire 208. The opposite side of battery 200 may be connected directly to ground through a normally open relay controlled contactor 210a. The relay controlled switch 210a will be pulled to a closed position whenever the relay coil 210 is energized.

One side of the battery 202 is connected to a relay controlled switch 210b which is pulled to a closed position whenever the relay coil 210 is energized. The opposite side of battery 202 is connected with a relay operated switch 212a. The switch 212a is controlled by relay coil 212 and when this relay coil is energized, the switch will complete a circuit to ground for one side of the battery 202.

The opposite sides of batteries 200 and 202 are connected by a relay operated switch 214a which is pulled to a closed position whenever the coil winding 214 is energized. In a similar fashion, the opposite sides of batteries 202 and 204 are connected to a relay operated switch 216a which is pulled to a closed position whenever the relay coil 216 is energized. The batteries 204 and 206 likewise have opposite sides connected to relay operated switch 218a which is controlled by the relay coil 218.

One side of the battery 206 is connected directly to ground whereas the opposite side of this battery is connected to a relay operated switch 220a. Relay operated switches 220a and 220b are pulled to a closed position whenever the relay coil 220 is energized. It can be seen that the relay operated contactor 220b is connected between the battery 204 and ground. A relay operated contactor 212b is connected between one side of the battery 204 and the lead wire 208 and this contactor is pulled to a closed position whenever the relay coil 212 is energized.

The lead wire 208 is connected with a resistor 222 that is shunted by a relay operated switch 224a. The switch 224a is normally in an open position, but will be closed whenever the relay coil 224 is energized. The opposite side of resistor 222 is connected with the field winding 226 of a series wound motor, the armature of which is designated by reference numeral 228. It can be seen that one side of the field winding 226 is connected with the junction 230.

The energization circuit for the motor armature 228 includes the relay operated switches 232a and 232b which are normally open, but which are pulled to a closed position whenever the relay coil 232 is energized. The current may be reversed through the armature 228 when the relay operated switches 234a and 234b are closed. The contactors 234a and 234b are normally open, but will be shifted to a closed position whenever the relay coil 234 is energized.

The system according to the FIGURE 3 embodiment includes a 24-volt control battery designated by reference numeral 236. One side of this battery is connected directly to ground whereas the opposite side of this battery is connected with the junction 238. The junction 238 is connected to one side of a relay operated switch generally designated by reference numeral 240a. The switch 240a is a normally open switch, but will be pulled to a closed position whenever the relay coil 240 is energized. The opposite side of relay operated switch 240a is connected with lead wire 208 as is clearly apparent from the drawing.

The junction 238 is connected to one side of a key operated switch 242, the opposite side of this switch being connected with junction 244. The junction 244 is connected with a control switch generally designated by reference numeral 246 which includes the shiftable contactor 248 and the fixed contacts 250, 252, and 254. As will become more readily apparent hereinafter, when the shiftable contactor 248 engages the fixed contact 250, the electric vehicle is set for forward movement, when the shiftable contactor engages contact 252, the vehicle is set for reverse movement, and when the shiftable contactor engages fixed contact 254, the vehicle will be set for charging the batteries.

The fixed contact 254 is connected with the lead wire 256 and it is seen that this lead wire is connected with junctions 258 and 260. The relay coil winding 240 is connected directly between junction 260 and ground and it is seen that a relay operated contactor 240b is connected between junction 260 and the lead wire 264. The relay operated contactor 240b is normally open, but will be shifted to closed position whenever the relay coil winding 240 is energized.

The fixed contact 252 of the control switch 246 is connected with junction 266. It is seen that the junction 266 is connected with lead wire 268 and this lead wire is connected with the junction 270. The relay coil winding 234 is connected between junction 270 and ground. Another relay coil winding 272 is connected between the junction 270 and ground. The coil winding 272 controls the operation of relay contactors 272a, 272b, 272c, 272d, 272e and 272f. The junction 266 is connected to one side of relay operated contactor 272f, the opposite side of which is connected with lead wire 274 and the junction 276. The contactor 272f is a normally open contactor and will be closed whenever the relay coil 272 is energized.

The contact 250 of control switch 246 is connected with the lead wire 280 and the junction 282. The junction 282 is connected with lead wire 284 and it is seen that this lead wire forms a common connection for the junction 276 and one side of the relay operated contactor 272a.

The control circuit of FIGURE 3 includes a pedal operated switch generally designated by reference numeral 290 that controls the speed of operation of the electrically propelled vehicle. The shiftable contactor of this switch is designated by reference numeral 292 and is coupled in any suitable fashion to an accelerator pedal 294 so that the depression of the accelerator pedal will cause the contactor 292 to shift from one fixed contact to another. The fixed contacts of switch 290 include a low speed contact 293, a medium speed contact 296, a high speed contact 298, and an emergency speed contact 300.

The "low speed" fixed contact 293 is connected with the lead wire 302 and it is seen that this lead wire is connected to one side of a relay operated contactor 304a. The relay operated contactor 304a is a normally open contact, but will be closed whenever the relay coil 304 is energized. The opposite side of the relay operated contactor 304a is connected with both of the relay coils 210 and 220. The lead wire 302 is likewise connected to one side of relay operated contactor 304b which is pulled to a closed position when the coil 304 is energized. The opposite side of relay operated contactor 304b is connected with the lead wire 306, and it is seen that this lead wire may energize the relay coil 212. The lead wire 306 is connected with a relay operated contactor 308a which is pulled to a closed position whenever the relay coil 308 is energized. The relay coil 308 also controls the relay operated contactor 308b which, as can be seen, controls the connection of lead wire 310 with the lead wires 312 and 314. The lead 312 is connected to energize the relay coil windings 214 and 218.

The "medium speed" contact 296 is connected to one side of relay operated contactors 272e and 272d. The opposite side of relay operated contactor 272d is connected with the lead wire 320. The lead wire 320 is connected with junction 322. The relay operated contactors 324a and 324b both have one side connected with the junction 322. The contactors 324a and 324b are controlled by the relay coil windings 324. It can be seen that the relay contactor 324a controls the energization of relay coil 308 and also the energization of the relay coil 330. The relay coil 330 controls the operation of relay operated contactor 330a, and this relay is of the time delay type with contactor 330a being pulled to a closed position at an interval of time following energization of coil 330.

The high speed fixed contact 298 is connected to one side of relay operated contactor 272b and is connected to one side of relay operated contactor 272c. The opposite side of relay operated contactor 272c is connected with a junction 332. The junction 332 is connected with relay operated contactors 334a and 334b, both of which are controlled by the relay coil 334. It can be seen that the junction 332 is also connected to one side of a relay operated contactor 336a. The contactor 336a is controlled by the relay coil 336 and this relay coil also controls the relay operated contactor 336b. It can be seen that the relay operated contactor 336b is connected to control the energization of the relay coil 338. The relay coil 338 controls relay operated contactor 338a and this is a time delay relay in that the contactor 338a will be closed at a predetermined time following the energization of the relay coil 338.

The "emergency" contact 300 of switch 290 is connected with a lead wire 340 and it is seen that this lead wire is connected with the junction 342. The junction 342 connects with one side of relay coil 224 and also connects with one side of relay operated contactors 336c and 336d. These contactors are controlled by relay coil 336 and it is seen that the contactor 336c is normally closed whereas the contactor 336d is normally open. The contactor 336d is connected with a relay operated contactor 339a which is pulled to a closed position following a predetermined time delay after the energization of relay coil 339. The relay coil 339 is connected with junction 341 and it is seen that this junction is connnected with the lead wire 264.

One side of the relay operated contactor 336c is connected with the lead wire 350 and it is seen that this lead wire is connected to one side of relay operated contactors 308c and 304c. The contactor 308c is operated by relay coil 308, whereas the contactor 304c is operated by the relay coil 304. The opposite sides of contactors 304c and 308c are connected with the lead wire 352 and it is seen that this lead wire is connected with the junction 354. The junction 354 is connected with a manually operable switch 356, the opposite side of this switch being connected with lead wire 358. The lead wire 358 is connected to one side of relay coil 216, and it is therefore operable to energize this coil under certain switching conditions.

A switch 360 is connected between the lead wire 284 and one side of the relay operated contactors 334b and 336a. This switch is open except when the switch 290 is shifted to engage the "emergency" fixed contact 300 whereupon the switch 360 will be closed. A relay coil 380 is connected between the lead wire 264 and ground. This relay coil operates the contactors 380a and 380b.

Assuming now that the driver of the electrically propelled vehicle desires to move forward in a low speed mode of operation, the contactor 248 of switch 246 is shifted to engage the fixed "forward" contact 250. The accelerator pedal 294 is now depressed until the contactor 292 engages the fixed contact 293. It can be seen that with the contactor 248 engaging contact 250, the coil winding 232 will be energized to cause a closure of contactors 232a and 232b, and therefore complete circuit for the motor armature 228. With contactor 292 engaging fixed contact 293, the relay coil 304 will be energized via lead wires 302 and 382. With relay coil 304 energized, the contactors 304a and 304b are pulled to a closed position to complete a circuit for relay coils 210 and 220 and also for the relay coil 212. This will operate the relay operated contactors controlled by these coils to connect all of the batteries 200, 202, 204, and 206 in parallel to supply the motor field and armature. The contactor 304c is closed when relay coil 304 is energized so that the coil winding 224 will now be energized to cause a closure of contactor 224a and therefore a short circuiting of the resistor 222 which may be in the neighborhood of .02 ohm in the voltage system that has been described. The vehicle now may be driven indefinitely with a 6-volt energization of the motor as long as the accelerator pedal is held in such a position that the contactor 292 engages the fixed contact 293.

If the pedal 294 is shifted so that the contactor 292 engages the "medium" or "middle" contactor 296, the speed of the vehicle will be increased. In going to this position, it is kept in mind that the contactor will have previously engaged fixed contact 293 so that the relay coil 304 will have been energized. When shifting to contact 296, however, the time delay relay coil 338 will be energized via a circuit that includes lead wire 384, junction 322, lead wire 320, and the closed relay contactor 272d. At a predetermined time delay following the energization of relay coil 338, the contactor 338a will be pulled to a closed position. This will complete a circuit for the relay coil 324 to cause the contactor 324a to be pulled to a closed position and the contactor 324b will be pulled to an open position. The opening of contactor 324b causes a deenergization of relay coil 304, whereas the closing of contactor 324a will complete a circuit for relay coils 308 and 330. Since relay coil 330 is part of a time delay relay, the contactor 330a will be closed at a predetermined time following the energization of relay coil 330. The energization of relay coil 308 causes contactors 308a and 308b to close and also causes contactor 308c to close. With the closure of contactors 308a and 308b, the relay coils 212, 214, and 218 are all energized and it therefore can be seen that the batteries 200 and 202 will be connected in series and the batteries 204 and 206 will be connected in series and that the series connected batteries will be in parallel to supply the motor field and armature. With the closure of contactor 308c, the contactor 224a will once more be caused to short circuit the resistor 222 so that the motor will be supplied with twelve volts. The vehicle may now be driven indefinitely in the 12-volt mode of energization at high efficiency.

If the accelerator pedal 294 were depressed so that it engages the "high speed fixed" contact 298, the vehicle will be driven at still a higher speed than either of the other previously described positions. It is pointed out that in shifting into engagement with the fixed contact 298, the shiftable contactor 292 will engage the contacts 293 and 296. This will cause a mode of energization that has previously been described, or in other words, the coil winding 304 will be first energized as contact 293 is engaged and the time delay relay coil 338 will be energized as the contactor engages the fixed contact 296.

Assuming that the previously described switching has taken place, it can be seen that when time delay relay 330 is energized, it will cause a closure of the contactor 330a at the prescribed time delay. With relay contactor 330a in a closed position, the relay coil 334 will be energized. The relay coil 334 will cause the contactor 334a to open and the contactor 334b to close. The opening of contactor 334a will cause the deenergization of relay coil 338 and the closing of contactor 334b, will cause an energization of relay coils 380, 336, and the time delay relay coil 339. When coil winding 380 is energized, the contactors 380a and 380b are shifted to closed positions. The closure of contactor 380a will cause an energization of relay coils 214 and 218, whereas the closure of contactor 380b will cause an energization of relay coil 216. It can be seen that this will cause the batteries 200, 202, 204, and 206 to all be connected in series and therefore deliver twenty-four volts to the motor less the voltage drop across the resistor 222.

The energization of relay coil 336 causes the contactor 336a to close and the contactor 336b to open. This switching disconnects the relay coil 338 from the circuit and bypasses the relay coil 334 to thus keep relay coil 380 energized after relay coil 330 has dropped out relay coil 338 again. In a few seconds, the time delay relay coil 339 causes the contactor 339a to move to a closed position and therefore energize the relay coil 224. With relay coil 224 energized, the contact 224a is once more closed to short circuit the resistor 222. This applies the full twenty-four volts to the motor.

If the accelerator pedal 294 is depressed fully so that the contactor 292 engages the fixed contact 300, the relay coil 224 is energized immediately to cause the closure of contactor 224a and therefore a short circuiting of resistor 222. In this emergency mode of operation, the contactor 360 is caused to be closed simultaneously with the engagement of contactor 292 with fixed contact 300 to therefore immediately energize the relay coil 380. With coil 380 energized, the contactors 380a and 380b are pulled to a closed position to cause a series of switching operations which connect all of the batteries 200 and 206 in series and therefore immediately apply the full twenty-four volts to the motor. This full twenty-four volts is applied to the motor whether the switch 246 is in the forward position or in the reverse position.

If the switch 246 is shifted so that the contactor 248 engages the reverse contactor 252, the vehicle will move in a reverse direction. When contactor 248 engages the fixed contact 252, it can be seen that the relay coils 234 and 272 will be energized. The energization of relay coil 234 will cause the contactors 234a and 234b to close to therefore reverse the direction of current flow through the armature 228. The energization of relay coil 272 causes contactor 272a to open, 272b to close, 272c to open, 272d to open, 272e to close, and 272f to open. This will cause the motor to be energized with only six volts regardless of whether the switch 290 is in the "low," "middle," or "high speed" positions. This is true since the opening of contactor 272a will prevent the energization of the relay coil 232 which would provide forward operation of the motor. The opening of contactor 272d prevents the energization of relay coil 330 while the opening of contactor 272c prevents the energization of relay coil 338. The relay coils 308 and 380 are likewise prevented from being energized.

The closing of contactor 272f will energize the shiftable contactor 292. The closing of contactor 272e connects the "middle" fixed contact 96 with one side of contactors 304a and 304b while the closure of contactor 272b connects the same side of contacts 304a and 304b with the fixed contact 298. It thus can be seen that only the relay coil 210 can be energized when the switch 246 is in the "reverse" position and when the switch 290 is in either the "low," "middle," or "high" positions. The vehicle can therefore only accelerate with six volts when the conditions as just outlined before are met. It can be seen from the foregoing that when the vehicle is set for reverse movement, it will be accelerated either with six volts or with twenty-four volts.

When it is desired to charge the batteries of the system illustrated in FIGURE 3, the switch contactor 248 is shifted into engagement with the fixed contact 254. The contactor 356 is then shifted to a closed position. With contactor 248 engaging fixed contact 254, it can be seen that relay coil 240 will be energized as will relay coils 214 and 218. The closure of switch 356 will cause an energization of relay coil 216. With relay coils 214, 216, and 218 energized, it can be seen that the batteries 200 to 206 will be connected in series with the lead wire 208. These series connected batteries will be connected in parallel with the twenty-four volt control battery 236 due to a closure of the contactor 240a. The charger for charging these batteries is connected between junction 290 and ground and it is therefore seen that the control battery 236 and the series connected batteries 200 to 206 will be charged when the switch 246 is shifted to the "charge" position and when the switch 356 is closed. It can be seen that with the energization of relay coil 240, the contactor 240c is shifted to an open position to prevent the energization of relay coil 232 and therefore the closure of contactors 232a and 232b. The relay coil 234 cannot be energized when the contactor 248 is in engagement with fixed contact 254 so that the contactors 234a and 234b cannot be closed when charging the battery.

It is to be pointed out that the relay coil 272 and its associated contactors prevents conflict between the operation of relay coil 232 and relay coil 234. It also prevents delivery of more than six volts to the motor when the switch 246 is in a reverse position except when the switch 292 is shifted into engagement with the emergency fixed contact 300. With the circuit as described, the relay coil 232 is prevented from being energized when the switch 246 is in the reverse position. The relay coil 336 prevents the untimely energizing of relay coil 380 in the case where the contacts operated by relay coil 339 remain closed after a temporary releasing of switch 290.

It can be seen that with the system as just described, the batteries 200, 202, 204, and 206 supply the current for operating the motor that drives the electrically propelled vehicle. The battery 236 may be termed a "control battery" since it supplies the various relay coil windings for operating the contactors that control the operation of the electric motor and the connection of the batteries in the system While the embodiments of the present invention as herein disclosed, constitute preferred forms, it is to be understood that other forms might be adopted.

What is claimed is as follows:

1. In combination, a vehicle, an electric motor connected to drive said vehicle, a plurality of storage batteries operable to energize said electric motor, first manually operable switch means having a forward position and a reverse position for controlling the direction of current flow through said motor to thereby select either a forward or reverse movement for said vehicle, second manually operable switch means having a low position and a high position for varying the voltage applied to said electric motor to thereby control its speed of rotation, said motor being energized with a lower voltage when said second manually operable switch means is in its low position, and means for causing said electric motor to be energized only with said lower voltage when said first manually operable switch means is shifted to its reverse position and said second manually operable switch means is shifted to its high position.

2. In combination, a vehicle, an electric motor connected to drive said vehicle, a plurality of storage batteries for energizing said electric motor, first manually operable switch means having a forward position and a reverse position for controlling the direction of current flow through said motor and therefore the direction of rotation of said motor, second manually operable switch means having a low position and a high position, means connected with said second manually operable switch means for connecting said batteries in parallel and with said motor through a resistor when said second manually operable switch means is shifted to its low position, means for connecting said batteries in series for energizing said electric motor when said second manually operable switch means is in its high position, and means for preventing said batteries from being connected in series when said first manually operable switch means is in its reverse position and said second manually operable switch means is in its high position.

3. In combination, a vehicle, an electric motor connected to drive said vehicle, a plurality of said storage batteries for energizing said electric motor, a speed selector switch having a low position, a high position and an emergency position, means connected with said speed selector switch for increasing the voltage applied to said motor from said storage batteries in a step-wise fashion with a time delay between steps when said selector switch is in its low position, means connected with said speed selector switch for causing the voltage that is applied to said motor from said batteries to be increased in a step-wise fashion with a time delay between steps when said selector switch is shifted to its high position, and means for causing said batteries to be connected in series and directly with said motor when said selector switch is in its emergency position.

4. A motor control system for a battery powered vehicle comprising, an electric motor, a plurality of batteries, means for connecting said batteries in parallel or in series and with said electric motor to vary the energization of the electric motor to thereby vary its output speed, a manually operable speed selector switch having at least two operative positions, a resistor connected between said batteries and said electric motor, a first relay having normally open contacts connected across said resistor, said first relay having an actuating coil, a time delay relay having an actuating coil and switching contacts, said time delay relay being operable to close said switching contacts at a predetermined time following the energization of its actuating coil, means electrically connecting said actuating coil of said time delay relay with one side of said manually operable speed selector switch, and means connecting the contacts of said time delay relay in controlling relationship with the actuating coil of said first relay whereby said resistor is short circuited at a predetermined time delay following the closing of a circuit to the actuating coil of said time delay relay by said speed selector switch.

5. A motor control system for a battery powered vehicle comprising, a plurality of batteries, an electric motor for driving said vehicle, a control means for connecting said batteries in series or in parallel with said electric motor, a resistor connected between said batteries and said electric motor, a first relay having an actuating coil and switch contacts, said switch contacts being connected across said resistor whereby said resistor is short circuited when said switch contacts are closed, a manually operable speed selector switch having at least two operative positions, first and second time delay relays each having switching contacts and actuating coils, means connecting the switch contacts of said first time delay relay in controlling relationship with the actuating coil of said first relay, means connecting the switching contacts of said second time delay relay in controlling relationship with said control means, and means connecting the actuating coils of said first and second time delay relays with said manually operable speed selector switch.

6. A motor control system for a battery powered vehicle comprising, an electric motor, a plurality of batteries, a first control means for connecting said batteries in series or in parallel with said motor, a second control means for controlling the resistance of a circuit connecting said batteries and motor, a manually operable speed selector switch having a plurality of terminals, a plurality of time delay means each including switch means, said time delay means being operative to close its switch means after a predetermined time following its energization, means connecting the switch means of one of said time delay means with said first control means, means connecting the switch means of the other of said time delay means with said second control means, and means electrically connecting the output terminals of said speed selector switch respectively with said time delay means.

7. A motor control system for a battery powered vehicle comprising, an electric motor, at least four batteries, a control means for connecting all of said four batteries in series, said control means being operative to connect two of said batteries in parallel with the other two batteries and being operative to connect all of said batteries in parallel, a manually operable speed selector switch having a plurality of controlling positions, means for causing all of said batteries to be connected in parallel with each other when said speed selector switch is in a first position, means for causing two of said batteries to be connected in parallel with two of the other batteries when said speed selector switch is shifted to a second position including time delay means energized from said speed selector switch when it is moved to its second position, and means for causing all of said batteries to be connected in series when said speed selector switch is moved to a third position, said last-named means including a time delay means for causing said batteries to be connected in series only after a predetermined time delay following the movement of said speed selector switch to its third position.

8. A motor control system for a battery powered vehicle comprising, an electric motor, a plurality of batteries, a manually operable speed selector switch having a plurality of operative positions, a first control means for connecting said batteries in series or in parallel, a resistor connecting said batteries and said motor, a second control means for short circuiting said resistor, means for causing operation of said control means to connect said batteries in parallel and for maintaining said resistor in the circuit between said motor and batteries when said speed selector switch is in a first position, means including time delay means for operating said second control means to cause said resistor to be short circuited at a predetermined time delay following movement of said speed selector switch to its first position, means operating said first control means to connect said batteries in series when said speed selector switch is shifted to a second position, and means including time delay means operating said second control means at a predetermined time delay following the movement of said speed selector switch to its second position to cause a short circuiting of said resistor.

(References on following page)

References Cited by the Examiner

UNITED STATES PATENTS

| | | | |
|---|---|---|---|
| 995,438 | 6/1911 | Cheney | 318—411 |
| 1,110,821 | 9/1914 | Radley | 318—412 X |
| 1,324,194 | 12/1919 | Harries | 318—412 X |
| 1,597,896 | 8/1926 | James et al. | 318—411 |
| 2,104,654 | 1/1938 | Jones | 318—403 X |
| 2,492,395 | 12/1949 | Pavitt et al. | 318—422 |
| 2,622,233 | 12/1952 | Field | 320—2 |
| 2,666,175 | 1/1954 | Seeger | 318—422 |
| 2,746,002 | 5/1956 | Robillard | 320—2 |
| 3,134,063 | 5/1964 | Hastings | 318—139 |

ORIS L. RADER, *Primary Examiner.*

MILTON O. HIRSHFIELD, *Examiner.*